United States Patent
Dayton et al.

(10) Patent No.: US 10,589,455 B2
(45) Date of Patent: Mar. 17, 2020

(54) FOAM INSULATION WITH THERMOFORMABLE FILM COATING AND PROCESS FOR MANUFACTURE

(71) Applicant: POLYMER TECHNOLOGIES, INC., Newark, DE (US)

(72) Inventors: Jeremy Dayton, Newark, DE (US); Robert Marsh, Wilmington, DE (US); Robert Prybutok, Newark, DE (US)

(73) Assignee: Polymer Technologies, Inc., Newark, DE (US)

( * ) Notice: Subject to any disclaimer, the term of this patent is extended or adjusted under 35 U.S.C. 154(b) by 294 days.

(21) Appl. No.: 15/526,960

(22) PCT Filed: Nov. 24, 2015

(86) PCT No.: PCT/US2015/062428
§ 371 (c)(1),
(2) Date: May 15, 2017

(87) PCT Pub. No.: WO2016/085984
PCT Pub. Date: Jun. 2, 2016

(65) Prior Publication Data
US 2017/0355126 A1    Dec. 14, 2017

Related U.S. Application Data

(60) Provisional application No. 62/084,208, filed on Nov. 25, 2014.

(51) Int. Cl.
*B32B 5/18*    (2006.01)
*B29C 51/12*   (2006.01)
(Continued)

(52) U.S. Cl.
CPC .............. *B29C 51/12* (2013.01); *B29C 51/16* (2013.01); *B29D 99/001* (2013.01); *B32B 5/18* (2013.01);
(Continued)

(58) Field of Classification Search
CPC ....... B29C 51/12; B29C 51/16; B29D 99/001; B29K 2995/0002; B29K 2995/0015;
(Continued)

(56) References Cited

U.S. PATENT DOCUMENTS 4,034,137 A * 7/1977 Hofer ................. B32B 7/04
                                                   428/322.7
4,121,960 A   10/1978 Focht
(Continued)

FOREIGN PATENT DOCUMENTS

DE    3507667 A1    8/1987
JP    2011194796 A  10/2011
WO    2006098745 A2  9/2006

OTHER PUBLICATIONS

"What is the Difference Between Open-cell and Closed-cell Polyurethane Foams?", 2008, accessed on Sep. 12, 2019 from www.foam-tech.com/products/urethane_foam/open_closed_cell.htm (Year: 2008).*

(Continued)

*Primary Examiner* — Claude J Brown
(74) *Attorney, Agent, or Firm* — RatnerPrestia

(57) ABSTRACT

A thermal/acoustic insulation product, such as for an aircraft, comprising a block of flexible, open-celled, cellular foam having a predefined shape and having a thermoformed amorphous film covering that completely envelops the foam block. A process for making the insulation product includes first cutting the block of foam to a predefined shape, such as a shape suitable for placement in an area of an aircraft in (Continued)

need of insulation. Then, a first sheet of film is heated to its melt point and conformed to a first surface area of the block, and a second sheet of film is heated to its melt point and conformed to a second surface area of the block, wherein the first film and the second film are joined to one another at one or more seams. The insulation product may then be installed in an aircraft.

32 Claims, 4 Drawing Sheets

(51) Int. Cl.
| | |
|---|---|
| B29D 99/00 | (2010.01) |
| B29C 51/16 | (2006.01) |
| B32B 27/00 | (2006.01) |
| B64C 1/40 | (2006.01) |
| B60R 13/08 | (2006.01) |
| B29L 31/30 | (2006.01) |
| B29C 51/10 | (2006.01) |
| B29K 105/04 | (2006.01) |
| B32B 27/06 | (2006.01) |
| B32B 27/28 | (2006.01) |
| B32B 27/30 | (2006.01) |
| B32B 1/00 | (2006.01) |
| B32B 3/04 | (2006.01) |
| B32B 3/06 | (2006.01) |
| B32B 3/26 | (2006.01) |

(52) U.S. Cl.
CPC .............. *B32B 27/00* (2013.01); *B60R 13/08* (2013.01); *B64C 1/40* (2013.01); B29C 51/10 (2013.01); B29C 2791/006 (2013.01); B29K 2105/04 (2013.01); B29K 2995/0002 (2013.01); B29K 2995/0015 (2013.01); B29K 2995/0091 (2013.01); B29L 2031/3005 (2013.01); B32B 1/00 (2013.01); B32B 3/04 (2013.01); B32B 3/06 (2013.01); B32B 3/266 (2013.01); B32B 27/065 (2013.01); B32B 27/281 (2013.01); B32B 27/286 (2013.01); B32B 27/304 (2013.01); B32B 2266/0214 (2013.01); B32B 2266/0285 (2013.01); B32B 2266/06 (2013.01); B32B 2307/102 (2013.01); B32B 2307/304 (2013.01); B32B 2307/31 (2013.01); B32B 2307/546 (2013.01); B32B 2307/5825 (2013.01); B32B 2307/738 (2013.01); B32B 2605/18 (2013.01)

(58) Field of Classification Search
CPC .... B29K 2995/0091; B32B 2266/0214; B32B 2266/0285; B32B 2266/06; B32B 2307/738; B32B 27/286; B64C 1/40
USPC .......................................................... 244/1 N
See application file for complete search history.

(56) References Cited

U.S. PATENT DOCUMENTS

| | | | | |
|---|---|---|---|---|
| 4,507,338 | A | * | 3/1985 | Freundlich .............. B32B 27/28 428/36.5 |
| 4,874,648 | A | | 10/1989 | Hill et al. |
| 5,147,710 | A | | 9/1992 | Bopp et al. |
| 7,040,575 | B2 | | 5/2006 | Struve et al. |
| 8,590,265 | B2 | | 11/2013 | Albertelli et al. |
| 2003/0077419 | A1 | | 4/2003 | Arndt et al. |
| 2004/0247819 | A1 | | 12/2004 | Khieu et al. |
| 2008/0272131 | A1 | * | 11/2008 | Roberts .................. G01K 1/024 220/592.25 |
| 2009/0110859 | A1 | * | 4/2009 | Larson, Jr. .............. C08L 67/04 428/36.9 |
| 2010/0143694 | A1 | | 6/2010 | Paplham et al. |
| 2010/0310844 | A1 | | 12/2010 | Möck et al. |
| 2011/0254196 | A1 | | 10/2011 | Vauchel et al. |
| 2011/0318564 | A1 | | 12/2011 | Qin et al. |
| 2012/0276368 | A1 | * | 11/2012 | Fernando ................ B32B 5/245 428/319.1 |
| 2012/0321868 | A1 | | 12/2012 | Richardson et al. |
| 2013/0122244 | A1 | | 5/2013 | Patel et al. |
| 2014/0147658 | A1 | | 5/2014 | Hosoma et al. |

OTHER PUBLICATIONS

International Search Report and Written Opinion for International Application No. PCT/US2015/062428, dated Feb. 2, 2016—11 Pages.
Solimide TA-301 Polyimide Foam Material Safety Data Sheet (Ima-Tech) Jul. 1, 1994—4 Pages.
Soundcoat Absorption Products, http://www.soundcoat.com/soundcoatabsorbers.pdf, Sep. 1, 2013, 2 pages.
Basotect the Versatile Melamine Resin Foam, http://product-finder.basf.com/group/corporate/product-finder/en/literature-document:/Brand+Basotect-Brochure-Asia-English.pdf, Jul. 1, 2014, 20 pages.
International Preliminary Report on Patentability for International Application No. PCT/US2015/062428, dated May 30, 2017, 9 pages.

* cited by examiner

FOAM INSULATION WITH THERMOFORMABLE FILM COATING AND PROCESS FOR MANUFACTURE

CROSS REFERENCE TO RELATED APPLICATIONS

This Application is a U.S. National Phase Application of PCT International Application Ser. No. PCT/US2015/062428, filed Nov. 24, 2015, and claims priority from U.S. Provisional Application Ser. No. 62/084,208, filed Nov. 25, 2014, titled FOAM INSULATION WITH THERMOFORMABLE FILM COATING AND PROCESS FOR MANUFACTURE, both of which are hereby incorporated by reference in their entirety.

BACKGROUND OF THE INVENTION

Prior art aircraft fuselage insulation primarily comprises fiberglass bats packaged in thin reinforced film bags produced by cutting, sewing and heat sealing the insulation within the bags. This process generally involves a CNC automated cutting system that cuts the fiberglass and films, and the product is then moved to an area where the multi-layered layup of film/fiberglass/film is heat sealed or sewn by individual operators. Since this involves significant labor, the majority of these insulation blankets are produced in low labor cost countries.

A significant cost in insulating an aircraft is the labor involved in installing the current fiberglass bagged insulation system. The fiberglass insulation bags do not have structural integrity and require a significant amount of mechanical fastening to hold them in position between the frames and over the stringers of an aircraft fuselage. In addition, a significant cost of the insulation parts is due to the high labor content in sewing and/or heat-sealing the bags.

In some instances, particularly in smaller aircraft or private aircraft, foam elements are used either alone or in combination with fiberglass; however they are covered in a similar manner, with covering films that are hand-sewn or hand-laminated.

In all cases the insulation and covering films both individually and as a composite must pass rigorous flame, smoke and toxicity ("FST") standards developed by the FAA and adopted by all aircraft manufacturers.

Most thermoplastic films used in packaging are amorphous but do not have the FST properties required by the aircraft industry. In addition, these thermoplastic films are typically processed at relatively low temperatures, typically well under 300 degrees Fahrenheit. Amorphous films that have FST properties typically have higher melt temperatures greater than 400, generally between 400 and 425, Fahrenheit.

SUMMARY OF THE INVENTION

One aspect of the invention comprises a thermal/acoustic insulation product for an aircraft. The insulation product comprises a block of flexible, open-celled, cellular foam having a predefined shape suitable for placement in a predefined area of the aircraft and having a covering that envelops, preferably completely, the foam block, wherein the covering comprises a thermoformed amorphous film, such as but not limited to a thermoformed amorphous film having a melt point greater than 400 F, generally between 400 and 425 F.

Another aspect of the invention comprises a process for making a thermal/acoustic insulation product for an aircraft. The process comprises the steps of:

a. cutting a block of flexible, open-celled, cellular foam to a predefined shape suitable for placement in a predefined area of the aircraft; and b. at a thermoforming station, such as a semi-automatic thermoforming station:

i. heating a first sheet of thermoformable amorphous film to a melt point, such as but not limited to a melt point greater than 400 F, generally between 400 and 425 F, and conforming the first sheet of film to a first surface area of the block, such as but not limited to the top, sides, and any cut-out areas of the block; and ii. heating a second sheet of the thermoformable amorphous film to the melt point and conforming the second sheet of film to a second surface area of the block, such as but not limited to a bottom surface of the block;

joining one or more portions of the first sheet to the second sheet to create one or more seams so as to envelop, preferably completely, the shaped foam block in the thermoformed amorphous film.

DETAILED DESCRIPTION OF THE INVENTION

In one aspect, the invention generally relates to producing low density cellular foam insulation blocks with a thin covering film, such as for use as thermal/acoustical insulation for the fuselage of aircraft. The insulation product is not limited to any particular use, however.

A unique differentiator in the preferred film utilized for this process compared to traditional films used with aircraft insulation bags is that the preferred film has an amorphous structure, as opposed to the crystalline structure typically used in the films currently being utilized as covering films for aircraft insulation. A crystalline structure generally has a melt index that is too narrow to allow it to be successfully melted and formed.

Due to the higher melt temperature of amorphous films, a modified thermoforming equipment system may be used to allow the film to reach its melt temperature. For example, the film may be heated over the foam block and then allowed to quickly drape around the block, optionally with vacuum assistance, as compared to traditional systems in which a film is heated and shuttled into place. The set-up described above in which the film is heated in a position above the block and then draped over the block eliminates the potential heat loss while shuttling a thin amorphous film from its heating area to the application area.

Figure 1A:
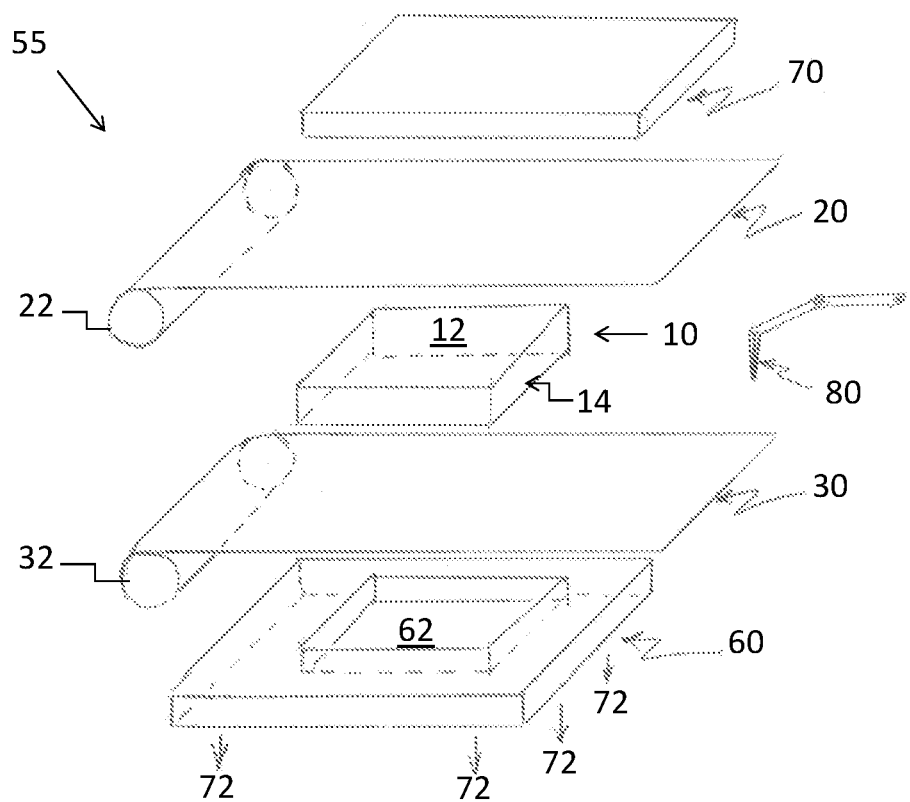
FIG. 1A depicts a schematic perspective view of a first exemplary process for manufacturing an exemplary encapsulated insulation block of the present invention.
Figure 1B:
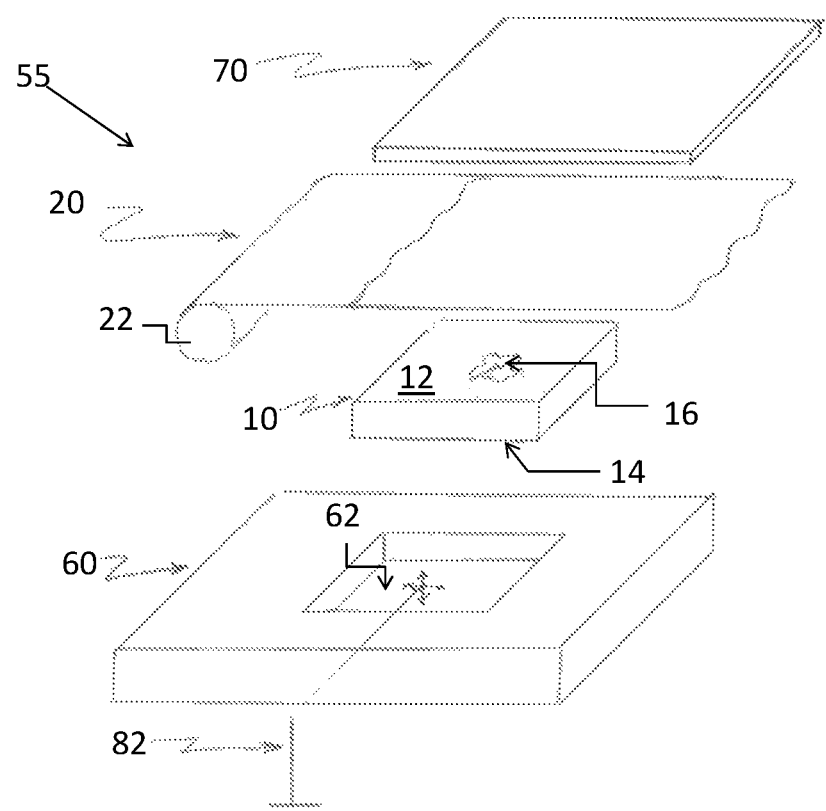
FIG. 1B depicts a schematic perspective view of a second exemplary process for manufacturing an exemplary encapsulated insulation block of the present invention.
Figure 1C:
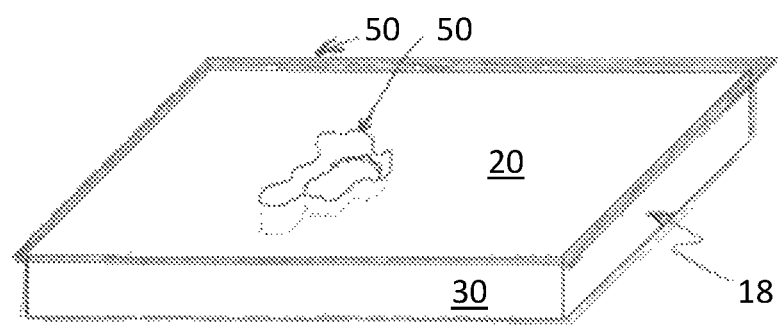
FIG. 1C depicts a perspective view of an exemplary encapsulated insulation.

Referring now to the figures, one embodiment of the invention involves an encapsulated foam part 18, shown in FIG. 1C, comprising a top film 20, a bottom film 30, and one or more sealed edges 50 at the interfaces between the top film and the bottom film, including around the perimeter of the part as well as in any openings 16 in the part, such that film totally encapsulates the exterior of the part. It should be understood that although block 10 is illustrated with an opening or cut out area in FIGS. 1B and 1C and without such an opening in FIG. 1A, blocks with or without openings may be used in connection with any of the processes described herein, and the resulting insulation products may or may not have one or more openings. Furthermore, although opening 16 is shown extending from top surface 12 to bottom surface 14 of block 10, one or more openings may be open only to one surface or the other.

As shown in FIG. 1A, one process for manufacturing encapsulated insulation part 18 comprises starting from a light weight cellular foam insulation block 10, such as one that has been fabricated in an automated system such as a Water Jet or CNC knife cutting system to the defined customer's shape. Thermoforming station 55, such as a semi-automatic thermoforming station, is shown and may have various features as are known in the art, including a vacuum forming station, one or more heaters, one or more rolls of the film to be thermoformed, a material handling system, and/or one or more robots capable of performing one or more process steps. The foregoing steps may be performed at one or more discrete stations or sub-stations within thermoforming station 55, as are known in the art, or at a single station. The term "semi-automatic" in reference to the thermoforming station means that the station may have at least one process performed thereon that is automated and at least one process that is manual. The processes described herein, however, are not limited to any particular degree of automation, nor do they exclude processes that are fully automated or fully manual.

Female tool 60 is designed with a concavity 62 to accommodate the perimeter dimensions and thickness of the foam part 10 to be vacuum sealed, and is manufactured from a permeable material that allows vacuum to be pulled through the tool, such as for example, but not limited to, from a HYVAC® syntactic foam vacuum fixture material manufactured by CMT Materials of Attleboro, Mass. Female tool 60 is placed on a vacuum forming station of thermoforming station 55 as is known in the art and bottom film 30, such as pulled from roll 32, is disposed over the female tool 60. Heater, such as radiant panel 70, heats film 30 to its thermoplastic range, after which vacuum 72 draws the film into the contour of the female tool. It should be understood that heater 70 may comprise any source capable of emanating heat or radiation, such as but not limited to thermal radiation, capable of causing the subject film to adopt a thermoformable state. Optionally, a tool, such as a preprogrammed robot arm of thermoforming station 55 or a manual operator, may then pierce the bottom film in any areas needed to communicate vacuum to openings 16 in foam 10, such as for example opening 16 that extends from bottom surface 14 to top surface 12 of block 10 shown in FIG. 1B. The formed foam block 10 is then placed in tool 60 on top of the formed bottom film. The top film 20 is then drawn over the part, such as from roll 22. The radiant panel 70 then heats the top film 20 to its thermoplastic range and vacuum 72 is initiated, which draws top film 20 through the openings of the foam part. A preprogrammed RF sealer 80, such as a sealer on a robot arm, then seals the top film 20 to the bottom film 30 along the perimeter of the part as well as in any interior areas. The encapsulated part 18 is then moved to a finishing area where any additional sealing is completed.

In another manufacturing process, depicted in FIG. 1B, the female tool 60 as described above is placed in position on the vacuum stage, such as by a material handling system 82 or manually. Material handling system 82 may comprise a conveying system, one or more robots having one or more functions, such as RF sealing, trimming, picking up and moving work pieces, and/or the like, including any components of thermoforming station 55 that perform processing or handling steps relative to a work piece. Any functions performed by the material handling system may also be performed manually. Top film layer is drawn, such as from roll 22, over part 10 and radiant panel 70 heats film 20 to its thermoplastic range. The vacuum then draws the top film onto the top surface 12 of part 10 and into any openings 16 of the foam part. The film may then be trimmed to size, such as by using a robot, which may also pick the part out of the tool temporarily. The bottom layer 30 of film is drawn over the permeable tool 60 and the radiant panel 70 engaged to heat the film to its thermoplastic range, after which the vacuum 72 is engaged, drawing the film into the female tool to line all surfaces. The partially covered part is then replaced in the tool 60, such as with the robot material handling system 82, and the perimeter as well as any openings in the foam part may be sealed, such as RF sealed by robot 82. The permeable female tool with the part is then moved out of the process area for inspection and any further work, such as by robot 82, which may also have the capability of trimming the film, pulling the film from the rolls, and cleaning up any film not attached to the block.

The process described with respect to FIG. 1B may have an advantage over the process of FIG. 1A for parts having one or more openings (not shown) that do not extend completely between the top surface 12 and bottom surface 14 of the foam block. Performing the top surface sealing step first permits the vacuum to be drawn through the foam block 10 to pull the film 20 into such partial openings. In many cases, multiple parts may have a similar outer periphery that may permit female tool 60 to be used in conjunction with numerous parts, some of which may differ only with respect to the location and size/shape of openings or cut outs. Such multiple parts may be manufactured utilizing the same permeable female tool such that tool can be left in place while each part is placed in the tool and then removed from the tool (along with any trimmed waste) when the process is complete.

It should be understood that although shown as a simplistic square block, aircraft parts in need of insulation tend to have irregular shapes (e.g., not perfect rectangles, squares, circles, or the like, but rather shapes that may have a number of complex concavities, convex portions, edges, cut outs, and the like. The subject process is ideal for covering such irregular shapes relative to prior art processes.

In a preferred embodiment of the invention, the light weight cellular foam may comprise a melamine foam block, such as a melamine foam block having a density in the range of 0.3 to 0.4 pounds per cubic foot. However, the light weight cellular foam may instead comprise a polyimide foam, a foam/fiberglass combination, or any foam insulation meeting the desired FST properties.

A preferred film comprises a polysulfone-type film, but any similar film that has an amorphous structure but also exhibits appropriate FST properties may be used. Suitable exemplary polysulfone films may include, without limitation, films of TECASON™ polysulfone (PSU), made by Ensinger Industries, Inc., of Washington, Pa., USA, or Ultrason® polyarylethersulfones (PAES) made by BASF Corporation, of Florham Park, N.J., USA. The term "polysulfone" as used herein is intended to include any type of polysolfone, including but not limited to polyphenylsulfone (PPSU), polyethersulfone (PESU), polarylether (PAES), and the like. Other suitable exemplary films may include, without limitation, aircraft grade thermoformable polyvinyl fluoride (PVF) and polyimides, particularly polyetherimides (PEI). The term "polyimides" as used herein is intended to include any type of polyimide suitable for the uses described herein, including but not limited to polyetherimides (PEI). Exemplary PVF materials include Tedlar® PVF made by DuPont of Wilmington, Del., USA. Exemplary polyimides include Ultem® amorphous thermoplastic polyetherimide, made by SABIC Global Technologies B.V. of the Netherlands, and KAPTON® polyamide, made by DuPont. In preferred embodiments, the thermoformed amorphous film has a melt point greater than 400 F, generally between 400 and 425 F, but the film may have a melt point higher than 425 as well. Films with a melt point lower than 400 F may also be suitable for some applications. The film may or may not have a heat seal coating, depending whether it is desired to have the film continuously bonded to the foam block during processing. Many current aircraft insulation films are reinforced to aid in tear resistance. If this property is desired, the film may also comprise a thermoplastic reinforcing media.

Depending on the thickness of the foam block and the quantity and size of cut-outs within the foam block, certain areas of the block may not be completely covered by the film in the automated thermoforming process described above. This may be acceptable for certain applications, or the block may be further manually processed to fully cover these otherwise-incompletely-covered areas. Ideally, however, the blocks, the orientation and geometry of any cut-outs, and the automated process are configured so that any cut outs are covered using the automated process.

Figure 2:
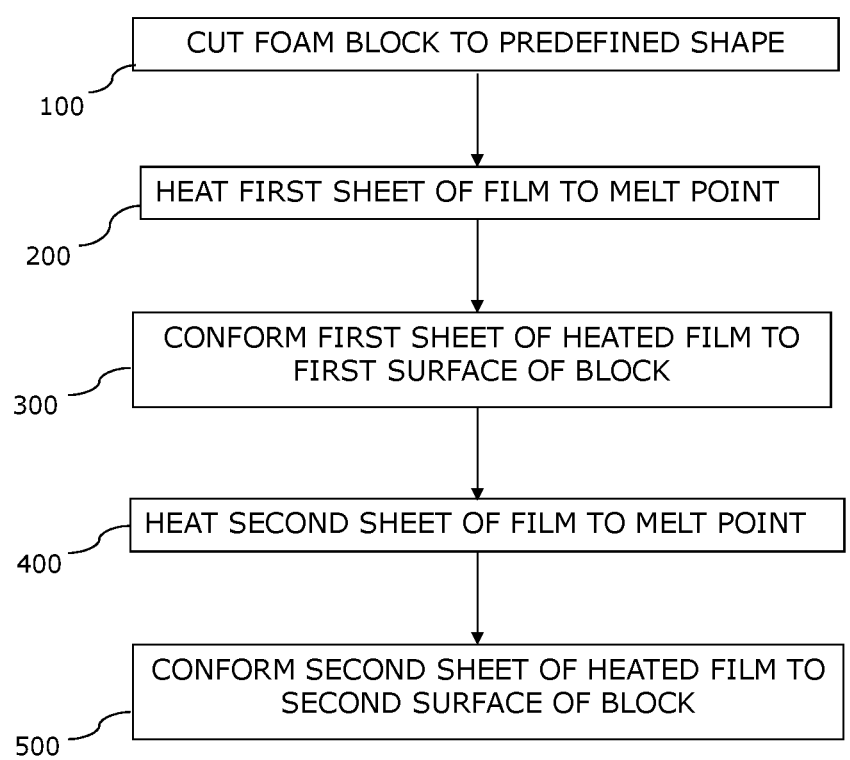
FIG. 2 depicts an exemplary flow chart for a process for making an exemplary thermal/acoustic insulation product.

The flow chart of FIG. 2 outlines a process for making an exemplary thermal/acoustic insulation product, also with reference to FIG. 1B. The process comprises in step 100, cutting a block of flexible, open-celled, cellular foam 10 to a predefined shape suitable for placement in a predefined area, such as a predefined area of the aircraft. Step 200 comprises, at a semi-automatic thermoforming station, heating a first sheet 20 of thermoformable amorphous film to its melt point, such as but not limited to a melt point greater than 400 F, generally between 400 and 425 F, and in step 300, conforming the first sheet of film 20 to a first surface area 12 of the block 10, such as but not limited to the top, sides, and any cut-out areas of the block. Step 400 comprises heating a second sheet of the thermoformable amorphous film 30 to the melt point and in step 500, conforming the second sheet of film to a second surface area 14 of the block, such as but not limited to a bottom surface of the block, such that the second covered surface area overlaps with the first covered surface area to envelop, preferably completely, the shaped foam block in the thermoformed amorphous film. A seam 50 may be formed where the first sheet of film 20 and the second sheet of film 30 overlap. Seam 50 may be processed, such as with an RF sealer, to ensure that film sheets 20 and 30 are adequately bonded to one another. As shown in FIG. 1B, the step of conforming the second sheet of film to the second surface of the block may comprise first conforming the sheet to a female tool having a concavity 62 that corresponds to the bottom surface 14 of the foam block.

Advantages

Insulation blocks manufactured from cellular foam blocks have inherent structural stability and compressive strength not found in conventional fiberglass bagged insulation. Due to this difference, foam insulation blocks can be installed into an aircraft fuselage with much less mechanical retention and a much lower labor content for installation as compared to conventional fiberglass bagged insulation.

Automation of the process for encapsulating foam insulation blocks reduces the labor content of the insulation system and offsets the higher cost of the foam as compared to fiberglass.

Although described herein with reference to specific embodiments, the invention is not intended to be limited to the details shown. Rather, various modifications may be made in the details within the scope and range of equivalents of the claims and without departing from the invention.

Specifically, although discussed in terms of a preferred embodiment in which the film comprises an amorphous film, the invention is not limited to any particular type of film. Accordingly, any film that has the requisite FST and heat shaping characteristics for use in connection with a thermoforming operation as described herein may also be used, whether amorphous or non-amorphous.

What is claimed:

1. A thermal/acoustic insulation product having a predefined shape, the insulation product comprising:
   a block of flexible, open-celled, cellular foam having the predefined shape; and
   a covering completely enveloping the foam block, the covering consisting of a thermoformed amorphous film conformed to the predefined shape of the foam;
   wherein the block of foam, the film, and the insulation product conform to flame, smoke and toxicity standards suitable for installation in an aircraft.

2. The insulation product of claim 1, wherein the predefined shape of the block of foam and the insulation product is an irregular shape.

3. The insulation product of claim 1, wherein the melt point of the thermoformed amorphous film is greater than 400 F.

4. The insulation product of claim 3, wherein the melt point of the thermoformed amorphous film is between 400 and 425 F.

5. The insulation product of claim 1, wherein the block comprises a cut-out area and wherein the covering covers the cut out area.

6. The insulation product of claim 1, wherein the foam comprises a material selected from the group consisting of: melamine, polyimide, and a combination thereof.

7. The insulation product of claim 1, wherein the block comprises a combination of foam and fiberglass.

8. The insulation product of claim 1, wherein the film comprises a material selected from the group consisting of: polysulfone, polyvinyl fluoride, polyimide, and a combination thereof.

9. The insulation product of claim 1, wherein the covering comprises a first sheet of thermoformed film covering a first surface of the block and a second sheet of thermoformed film covering a second surface of the block, wherein the first sheet and the second sheet are connected to one another at one or more seams.

10. An aircraft comprising at least one portion in need of insulation, said at least one portion having the insulation product of claim 1 disposed therein.

11. The aircraft of claim 10, wherein the at least one portion of the aircraft has an irregular shape and the insulation product has a predefined irregular shape that conforms to the irregular shape of the at least one portion of the aircraft.

12. A process for making an insulation product having a predefined shape including a first surface area and a second surface area, the process comprising the steps of:

(a) first, cutting a block of flexible, open-celled, cellular foam to the predefined shape;
(b) then, in a semi-automatic thermoforming station:
  (i) heating a first sheet of a thermoformable amorphous film to a melt point of the film;
  (ii) conforming the first sheet of film to the predefined shape of the first surface area of the block;
  (iii) heating a second sheet of the film to its melt point;
  (iv) conforming the second sheet of the film to the predefined shape of the second surface area of the block,
  (v) joining one or more portions of the first sheet of film to adjoining portions the second sheet of film to create one or more seams such that the first and second sheets of film completely encapsulate the foam block in the predefined shape.

13. The process of claim 12, wherein the step (iv) of conforming the second sheet of the film to a second surface area of the block, comprises first (A) conforming the second sheet of the film to a concavity in a female tool, wherein the concavity corresponds to the predefined shape of the second surface area of the block; and (B) placing the block into the concavity comprising the conformed film.

14. The process of claim 13, wherein steps (iii) and (iv) are performed before steps (i) and (ii).

15. The process of claim 14 comprising, after step (iv), creating one or more punctures in the second sheet of the film corresponding to one or more open areas in the foam block.

16. The process of claim 12, wherein steps (i), (ii), (iii), and (iv) are performed in sequential order.

17. The process of claim 12, wherein the predefined shape corresponds to a shape of a portion of an aircraft in need of insulation.

18. The process of claim 17, wherein the portion of the aircraft in need of insulation has an irregular shape.

19. The process of claim 12, wherein each conforming step includes using vacuum to help conform the film to the block.

20. The process of claim 12, wherein the steps of heating the first and second films are performed in close proximity to the foam such that the heated film can be draped over the foam directly from the heating location.

21. The process of claim 12, wherein the heating steps comprising respectively heating the first and second films to temperatures greater than 400 F.

22. The process of claim 21, wherein the heating steps comprising respectively heating the first and second films to temperatures between 400 F and 425 F.

23. The process of claim 12, wherein the block comprises one or more openings and wherein the step of conforming the first sheet to the foam comprises covering the opening area.

24. The process of claim 23, wherein the opening extends from a first surface of the block to a second surface of the block.

25. The process of claim 23, wherein the opening is open only to one surface of the block.

26. The process of claim 12, wherein the foam comprises a material selected from the group consisting of: melamine, polyimide, or a combination thereof.

27. The process of claim 12, wherein the block comprises a combination of foam and fiberglass.

28. The process of claim 12, wherein the film comprises a material selected from the group consisting of: polysulfone, polyvinyl fluoride, polyimide, and a combination thereof.

29. The process of claim 12, wherein the insulation product is a thermal/acoustic insulation product.

30. The process of claim 29, wherein the block of foam, the film, and the insulation product conform to flame, smoke and toxicity standards suitable for installation in an aircraft.

31. The process of claim 30, further comprising installing the insulation product into a portion of an aircraft in need of insulation.

32. The process of claim 12, wherein the first and second sheets of film consist of thermoformed amorphous film.

* * * * *